United States Patent [19]

Anglin et al.

[11] Patent Number: 5,128,524

[45] Date of Patent: Jul. 7, 1992

[54] DATA CARRIER READER APPARATUS FOR SELECTIVE DATA TRACK READING

[75] Inventors: Noah L. Anglin, San Jose; Stanley J. Hludzinski, Auburn, both of Calif.

[73] Assignee: Verifone, Inc., Redwood City, Calif.

[21] Appl. No.: 617,895

[22] Filed: Nov. 23, 1990

[51] Int. Cl.$^5$ .............................................. G06K 7/08
[52] U.S. Cl. .................... 235/449; 235/484; 360/106
[58] Field of Search ............... 235/449, 482, 483, 484, 235/485; 360/77.01, 106

[56] References Cited

U.S. PATENT DOCUMENTS

| | | | |
|---|---|---|---|
| 4,151,564 | 4/1979 | Schreiber et al. | 360/77.01 X |
| 4,752,676 | 6/1988 | Leonard et al. | 235/449 X |
| 4,954,698 | 9/1990 | Yashunaga et al. | 235/482 X |
| 5,019,696 | 5/1991 | Chang et al. | 235/482 X |

Primary Examiner—David Trafton
Attorney, Agent, or Firm—Lowell C. Bergstedt

[57] ABSTRACT

A data terminal having a card reader assembly for reading a data card having at least a pair of magnetic stripes formed thereon at adjacent ones of at least three defined magnetic data track locations thereon. The terminal includes a read head having two magnetic pickup elements on a front face thereof, the pickup elements being separated by a distance corresponding generally to the distance between the separated magnetic data track locations on the data card. A housing assembly defines a card guide slot adapted to guide a data card during a manual swipe of the card through the card reader assembly. The card guide slot comprises first and second opposite side wall sections and a bottom wall section with one of the side wall sections defining an access aperture for admitting the read head into the card guide slot. A read head positioning arrangement is cooperatively associated with the card guide slot for mounting the read head in a preselected position relative to the bottom wall section of the card guide slot such that the magnetic pickup elements are positioned for detecting a prearranged set of magnetic data tracks located at one of the upper two data track locations and the lower two data track locations.

2 Claims, 7 Drawing Sheets

DATA CARRIER READER APPARATUS FOR SELECTIVE DATA TRACK READING

FIELD OF THE INVENTION

This invention relates generally to apparatus for reading data tracks on data carriers. More specifically, this invention relates to data carrier reader apparatus for selectively reading data tracks comprising a subset of the total number of defined data tracks on a particular data carrier.

BACKGROUND AND PRIOR ART

In the prior art, reader apparatus for data carriers have typically employed a mounting arrangement designed to mount the transducer of the reader in one fixed relationship to the guide slot for the data carrier. For example, in a card reader designed to read two data tracks out of three possible tracks defined in a data card standard, the magnetic head mounting is designed to place the head and the two magnetic pickup head elements thereon in one fixed position relative to the bottom of the card slot. Thus a different mounting arrangement is required for reading tracks one and two together from that for reading tracks two and three together. The manufacture of a unit thus requires that the appropriate parts for one of these two mounting arrangements be obtained for assembly into the unit so that the required track reading will be achieved.

OBJECTS OF THE INVENTION

It is a principal object of this invention to provide an improved reader assembly for data carriers.

It is another object of this invention to provide an improved transducer mounting arrangement for reader assemblies.

It is another object of this invention to provide an transducer mounting arrangement of a single design which is capable of placing the transducer in different positions relative to a guide means for a data carrier to provide different data track reading requirements.

FEATURES AND ADVANTAGES OF THE INVENTION

One aspect of this invention features a reader assembly for reading a data carrier having at least one data track thereon located at one of at least two data track locations defined thereon. The reader assembly includes a transducer having at least one data pickup element on a front face thereof. A data carrier guide defining a guide slot having two side wall members and a bottom wall member is adapted to guide a data carrier through the reader assembly. One of these side wall members has an access window for the transducer means. A mounting arrangement is cooperatively associated with the guide means for mounting the transducer means in operative relationship to the access window and this mounting arrangement includes a positioning arrangement associated with one of the guide means and the mounting means for selectably fixing the position of the transducer means relative to a bottom guide surface of the guide means such that the data pickup element is substantially aligned with one of the two defined data track locations on a data carrier passing through the guide means.

One embodiment of this invention features an arrangement in which the mounting means mounts the transducer means in a fixed position relative to the access window and to the bottom wall member of the data carrier guide. The positioning arrangement comprises a guide insert member adapted to be mounted to the bottom wall member of the guide means for defining the distance from the bottom guide surface to the data pickup element. In this arrangement, the data pick up element is initially placed at a distance from the bottom wall member equal to the height of the highest data track position defined for the particular data carrier for which the reader is designed. A guide insert members of the appropriate thickness is then added if any data tracks closer to the bottom of the data carrier are to be read.

This arrangement provides the advantage that a single reader assembly design is readily customized for differing requirements of reading data tracks at differing heights on the card. Changes in the position of the bottom guide surface defined by the top surface of the bottom wall member of the data carrier guide may require that the guide insert member have a tapered portion at the ends thereof to provide a smooth transition to other adjacent card guide surfaces.

In another embodiment of this invention, the positioning means includes an arrangement defining a reference mounting line spaced from the bottom wall member of the guide means by a distance equal to the average of the distance to each of the two data tracks. A carrying means carries the transducer in a position with one data pickup element thereon spaced from the reference mounting line by a distance equal to one half the spacing between the two data track locations. The mounting arrangement is adapted to be mounted in one of two respectively inverted mounting relationships to the guide means. In this manner the data pickup element is positioned at one of two different vertical positions relative to the bottom wall member corresponding to one of the data track locations on the data carrier.

Thus, in this embodiment a single mounting arrangement with two different inverted mounting orientations gives the ability to customize the unit for different reading requirements without requiring different piece parts.

In one embodiment, this invention is especially adapted for a magnetic card reader assembly for a data card having a pair of magnetic data stripes at adjacent ones of three defined data track locations. In this case the read head may be positioned in a fixed location relative to the bottom of the card guide for reading the upper two data tracks on a data card. A guide insert member is adapted to be mounted to the bottom wall member of the card guide to alter the position of the read head relative to the bottom guide surface and thus to enable the read head to detect data on other pairs of data tracks on the card.

In another embodiment, the read head is mounted on a leaf spring and a clamp or bracket arrangement carries the leaf spring and read head and mounts it to a side wall member of the card guide. The arrangement for carrying the leaf spring on the clamp defines a reference mounting line and the leaf spring is designed to carry the read head in a position such that the pickup elements are asymmetrically located relative to the reference mounting line. The leaf spring and clamp are designed to mount the leaf spring and read head in one of two respectively inverted positions, in each of which the two read head pickup elements are positioned at different data track locations relative to the bottom guide surface defined by the bottom wall member of the card guide. In this manner a single mounting arrangement provides for multiple read head positioning and the costs and other disadvantages of multiple parts and multiple assembly operations for different reader requirements are avoided.

Other objects, features and advantages of this invention will be apparent from a consideration of the detailed description of various embodiments set forth below in conjunction with the accompanying drawings.

DETAILED DESCRIPTION OF EMBODIMENTS

Figure 10:
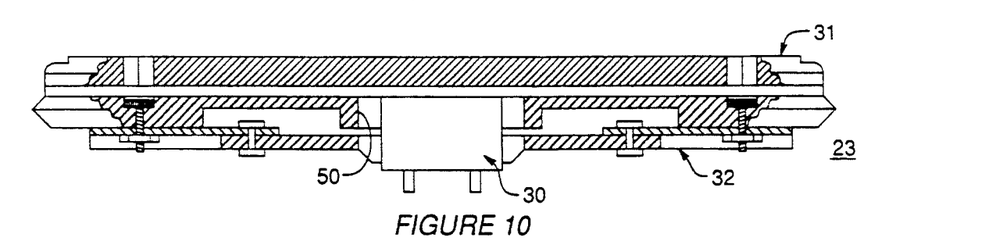
FIG. 10 is a partial section view of a data carrier reader subassembly in accordance with the general principles of this invention.
Figure 11:
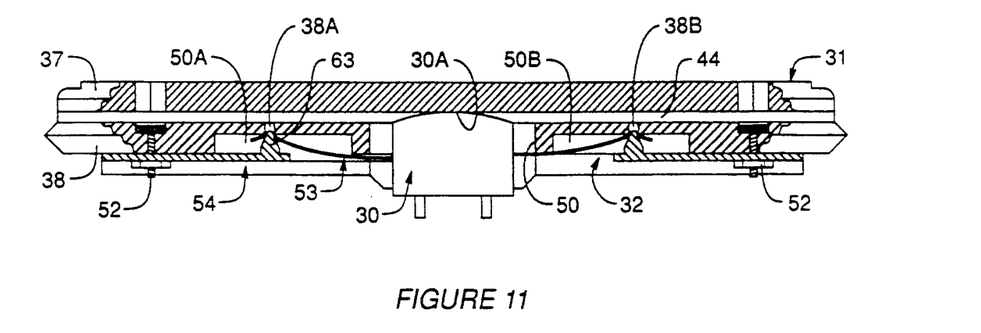
FIG. 11 is a partial section view of a magnetic data card reader subassembly in accordance with one embodiment of this invention.

Referring first to FIGS. 10-20 several embodiments of the invention will be described. FIG. 10 illustrates, along with FIGS. 12 and 13, one embodiment in which a clamp or bracket arrangement 32 carrying a transducer 30 defines a reference mounting line L1 relative to the bottom wall member of the guide with at least one of the data pickup elements, e.g. 30B of transducer 30 being positioned a distance away from this reference mounting line. Clamp arrangement 32 is adapted to be mounted to the guide element 31 in one of two respectively inverted positions such that pickup element 30B is position either above or below reference mounting line L1. A second pickup element 30C, if provided for dual track reading will be positioned substantially on reference mounting line L1 so that its position will be the same in both positions and will read data on the same data track regardless of the mounting orientation of clamp 32.

Figure 12:
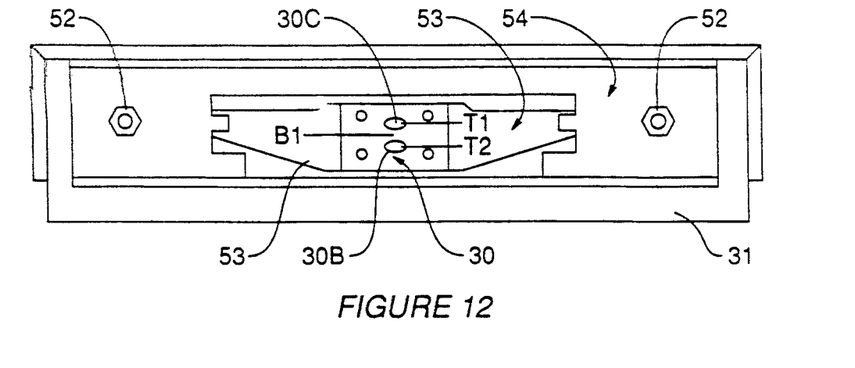
FIGS. 12 and 13 are side elevational views of alternative subassembly mounting arrangement for one embodiment of a card reader subassembly in accordance with this invention.
Figure 13:
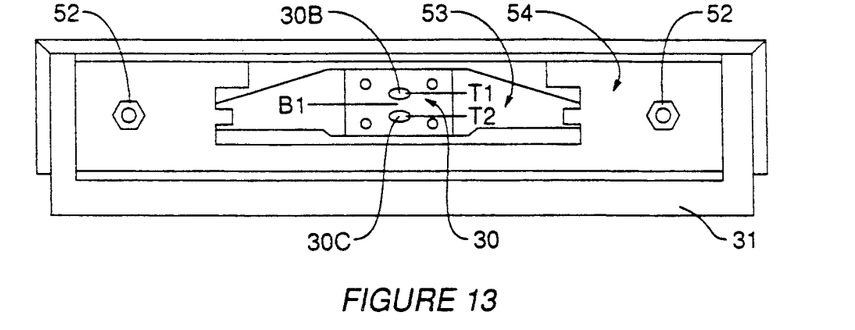

For purposes of this discussion, it will be understood that an equivalent arrangement is for one part of the overall clamp assembly 32, such as leaf spring 53, to have respectively inverted mounting positions, so that the position of that part alone determines the position of the transducer and which data tracks are being read.

More specific details of these elements and how they are assembled in a preferred embodiment which employs a replaceable card guide element 31 are given below. It should be understood that this invention could be applied in a card reader for a point of sale terminal in which the card slot is defined entirely by the terminal housing, such as is shown in Chang et al. U.S. Pat. No. 4,788,420, with appropriate adaptation of the transducer mounting arrangement relative to the housing to provide the respectively inverted mounting orientations and other characteristics of this invention.

Figure 19:
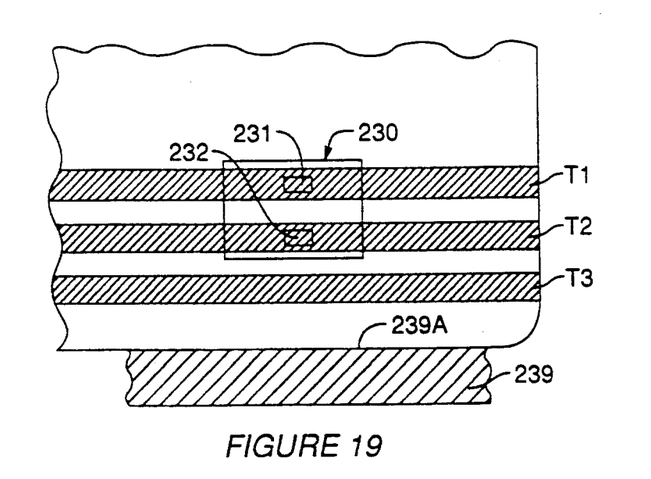
FIGS. 19 and 20 illustrate another embodiment of a card reader subassembly in accordance with this invention.
Figure 20:
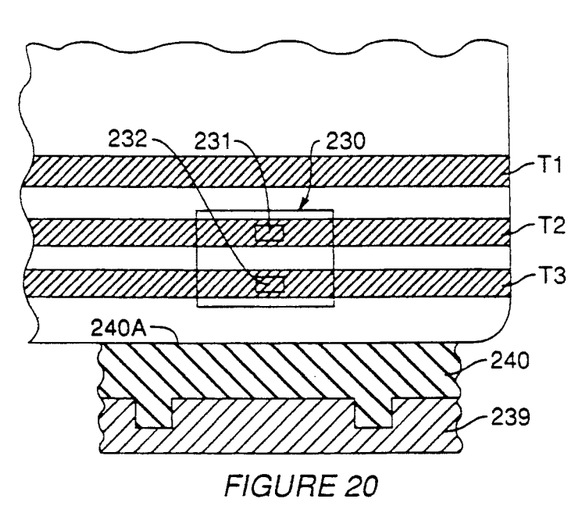

Referring now to FIGS. 19 and 20, another embodiment of this invention is illustrated. In this embodiment, a read head 230 is mounted in a fixed position relative to bottom wall member 239 of a card slot, but is adapted to have an insert member 240 mounted thereto to change the effective position of the bottom card guide wall from 239A as shown in FIG. 19 to 240A as shown in FIG. 20. This embodiment of the invention may be advantageously implemented using the replacable card guide element 31 shown in the other drawing figures, but may also be employed in a data terminal in which the card guide slot is defined by other structure, such as is illustrated in the above-referenced Chang et al. Patent. The insert member 240 may be of such a length that it covers the entire card guide bottom or it may be of a length to cover only a portion of the card guide bottom. In the latter case, the ends of insert member 240 may be tapered to provide a smooth transition to the adjacent card guide surfaces.

PREFERRED APPLICATION ENVIRONMENTS FOR THE INVENTION

Figure 1:
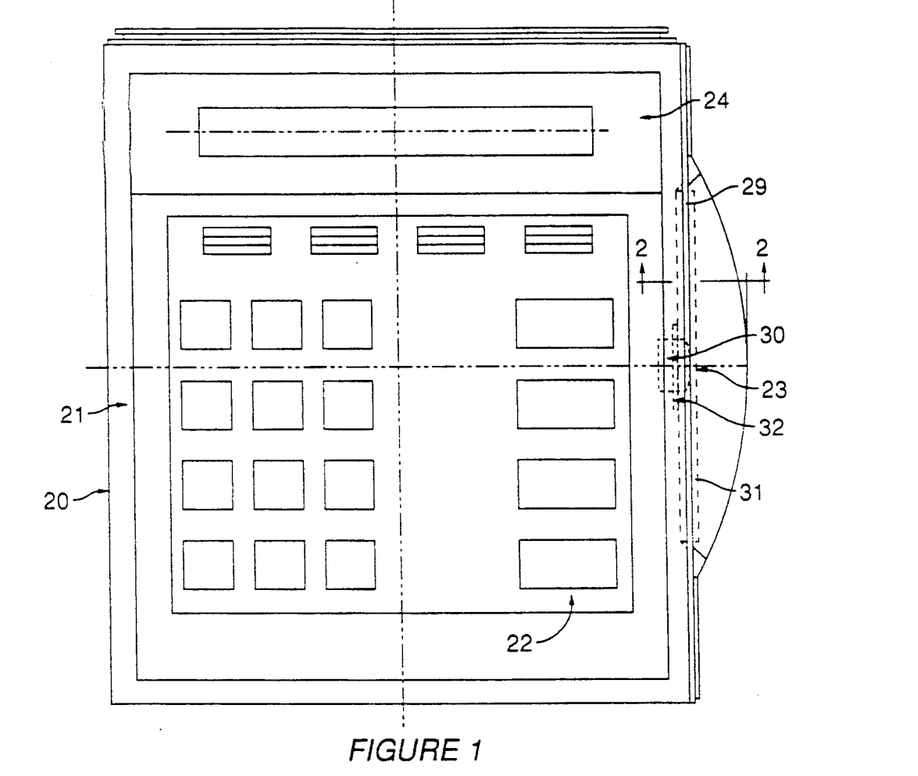
FIGS. 1-9 are miscellaneous views of different embodiments of point of said terminals with elements of card reader apparatus which may utilize a card reader design in accordance with this invention.
Figure 2:
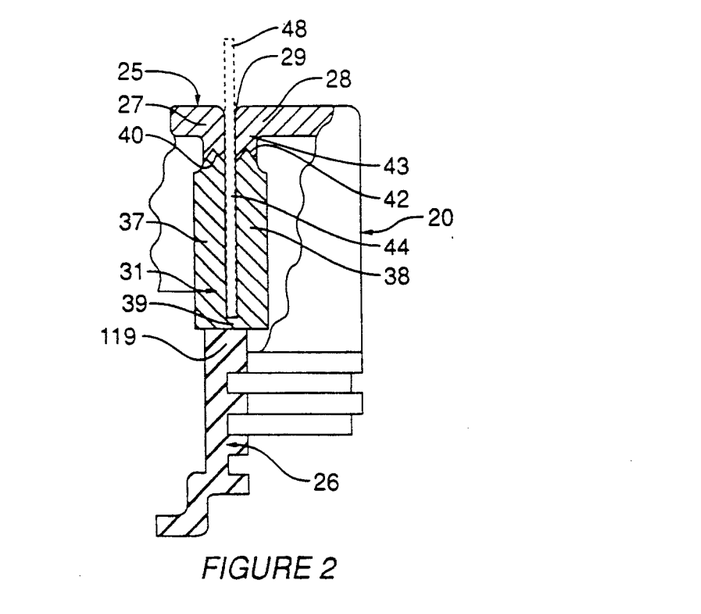

Referring now to FIGS. 1-5, the elements of preferred application environments for this invention are shown as comprising an apparatus 20 having a reader subassembly 23 for reading a data carrier 48 (FIG. 2). Apparatus 20 in this embodiment is in the form of a point of sale transaction automation terminal. Data carrier 48 as shown here is a plastic card, e.g. a credit card or a debit card or other form of data card, which carries a magnetic stripe having one or more data tracks thereon. FIGS. 19 and 20 illustrate such a card having up to three data track locations thereon. It should be understood that this invention is adaptable to use with various forms of data carriers in addition to data cards with magnetic stripes thereon, such as, for example, a data carrier with a bar code thereon or a data carrier, such as a check, with MICR bank account and identification data thereon.

Apparatus 20 includes a housing 21 which defines a guide slot location 29 for data carrier 48. A transducer in the form of magnetic read head 30 is provided for reading data stored on a data stripe on data carrier 48. A data carrier guide in the form of card guide 31 is removably mounted to housing 21 at data carrier slot location 29. Card guide 31 has a bottom wall portion 39 and a major side wall portion 37 and defines an access window (50 in FIG. 10). A mounting arrangement 32 is provided for mounting magnetic read head 30 at a prearranged location within access window 50 for accurate detection of data on the data stripe of data carrier 48 when it is manually swiped through guide slot 29.

Housing 21 is preferably formed as an injection molded housing using a material, such as 900 series "Lexan" brand of polycarbonate material. Other plastic materials capable of being injection molded, but meeting laboratory standards for terminal housings could also be used. These materials typically have wear characteristics which make them unsuitable to form the acting surfaces of a card guide, i.e. the surfaces would not withstand the large number of card swipes at which terminals of this type are typically specified.

Card guide 31 may be formed by machining, injection molding, or a combination of extruding and machining a material such as ultra-high molecular weight polyethylene. This is a strong material with good wear characteristics and is capable of withstanding a minimum of several million swipes of a card therethrough without showing substantial surface wear to the point of degrading card reading performance. Preferably, this material has a minimum of five percent by weight of carbon particles dispersed therein to lower the resistivity of the material for static charge control. While this produces a gray or black colored material, card guide element 31 is typically hidden within the housing of the terminal or other device.

The card guide element should be formed with smooth surfaces in the card guide slot region 44 so as to minimize wear on the data card passing therethrough.

Other materials with sufficient wear resistance could also be used for forming card guide element 31. For example, a material such as nylon 6/6 with thirty percent short glass fibers as well as a minimum of five percent of carbon particles dispersed therein could be employed.

Figure 3:
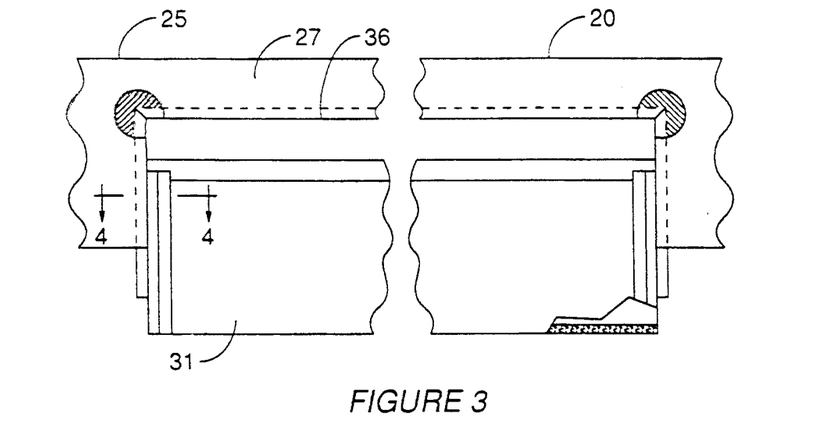
Figure 4:
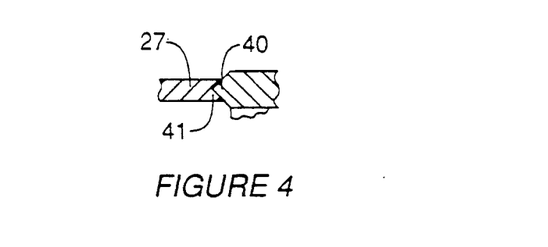

Point of sale terminal 20, which incorporates features of this invention, includes a housing assembly 21, a keyboard assembly 22, a card reader assembly 23, and a display assembly 24. Housing assembly 21 comprises a top enclosure section 25 and a bottom enclosure section 26 which snap together to form a complete enclosure for electronic circuit subassemblies (not shown) that are mounted therewithin. Removable card guide 31 is mounted in a rectangular opening 36 formed in side wall portion 27 of top enclosure section 25. As shown in FIGS. 3 and 4, each of the edge sections 41 that define rectangular opening 36 have a groove formed therein that cooperates with a tongue formed on edge portions 40 of side wall 37 of card guide 31. Thus side wall 37 as adapted to be removably mounted in opening 36 by sliding it in from the bottom of the opening.

Figure 5:
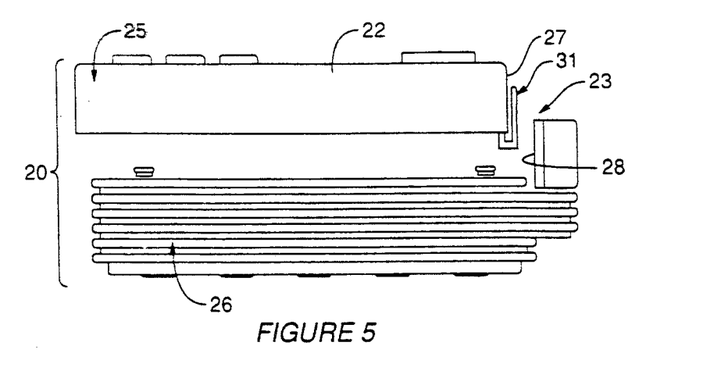

As shown in FIG. 2, side wall portion 28 of bottom enclosure section 26 and side wall portion 27 of top enclosure section 25 define card guide location 29. The active card guide slot 44 at the card reading location associated with read head 30 is, however, defined by side wall sections 37 and 38 and bottom wall section 39 of card guide 31. The upper edge of side wall section 38 has an outwardly extending tongue 42 formed thereon and this tongue cooperates with an associated groove 43 formed in side wall portion 28 to provide a stable, registered mounting relationship therebetween. As shown in FIG. 5, card guide 31 is first mounted to top housing member 25.

To assemble housing 21, the tongue portion 42 is slipped into the groove portion 43 and then top housing member 25 is rotated and snapped together with bottom housing member 26. Bottom wall section 39 of card guide 31 rests on a platform 49 formed on bottom enclosure member 26 to provide full confinement of card guide 31 within housing 21. This tongue and groove mounting arrangement ensures that side walls 37 and 38 of card guide element 31 guide element will be maintained in precisely registered positions and form an accurately dimensioned card guide slot 44. The material of guide slot 31 provides long wear and the removable mounting arrangement provides the opportunity to repair or replace this subassembly if it becomes defective through wear or other causes. This removable mounting arrangement also facilitates reconfiguring a particular terminal which has already been assembled from reading one set of tracks to reading another set of tracks using a transducer mounting arrangment in accordance with this invention as discussed generally above.

Figure 6:
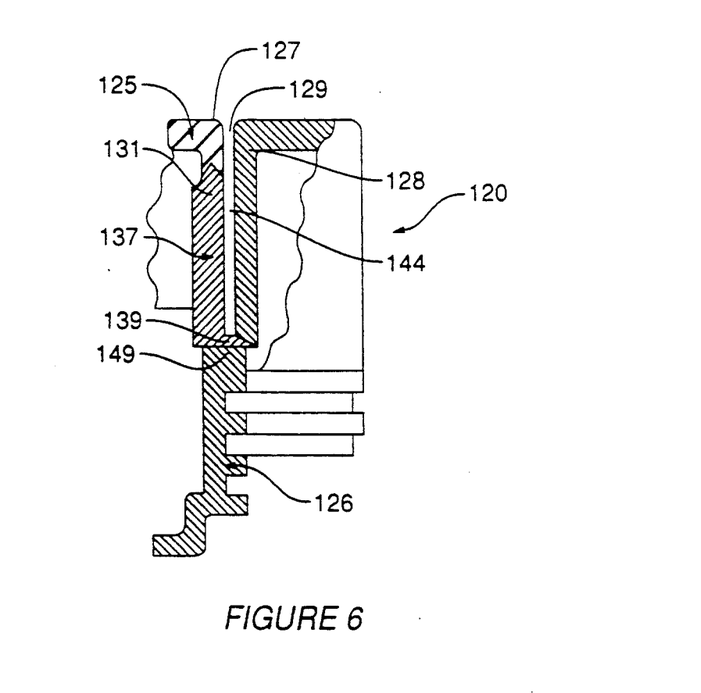

FIG. 6 illustrates an alternative application embodiment in the form of a terminal 120 with generally similar overall structure but with a variation in the card guide element 131. In this embodiment card guide element 131 is formed as one sidewall member 137 and a bottom wall member 139, which together with side wall 128 provided on bottom enclosure member 126 of the terminal housing define an accurate card guide slot 144 at slot location 129. Other structural and functional features and characteristics of this embodiment are essentially the same as the embodiment shown in FIGS. 1–5 and described above.

Figure 7:
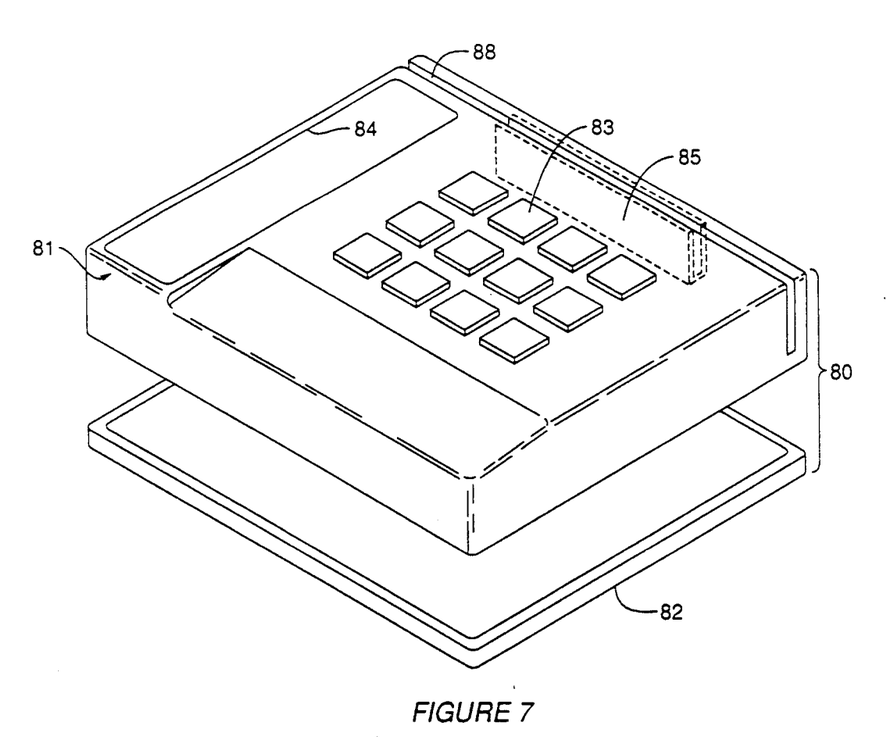
Figure 8:
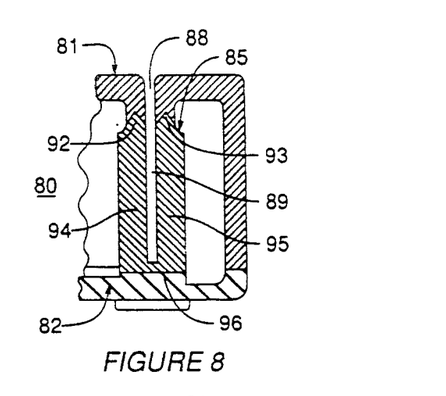
Figure 9:
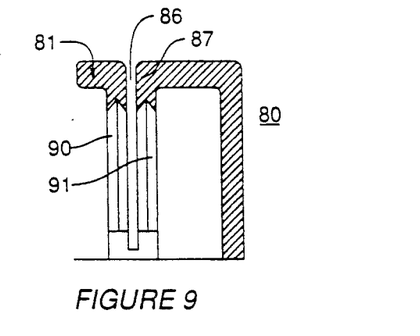

Referring now to FIGS. 7–9, an alternative embodiment of a point of sale terminal serving as an application environement for this invention will be described. In this embodiment, housing 80 is formed from a top enclosure member 81 and a bottom enclosure member 82 with top enclosure member 81 carrying a keyboard subassembly 83 and a display subassembly 84. In this embodiment guide slot location 88 is defined entirely within top enclosure member 81. As shown in FIGS. 8 and 9, card guide element 85 of the card reader subassembly of this invention is inserted into two rectangular apertures defined in side wall portions 86 and 87 using a tongue and groove arrangement similar to that of the previously described embodiment. Grooved edge portions 90 and 91 cooperate with tongue portions 92 and 93 on three edge portions of side wall members 94 and 95 to provide a secure registered mounting position for card guide 85 and an accurately dimensioned card guide slot 89. A platform 96 formed on bottom enclosure member 82 is provided to secure card guide element 85 within housing 80 when the top and bottom enclosure members are assembled together with the card guide element. This overall arrangement facilitates easy removal and replacement of the card guide element and the overall card reader subassembly if the need arises.

Referring again to FIG. 10 the general components of a reader subassembly 23 in accordance with this invention will be described in more detail. Reader subassembly 23 comprises a guide means 31 which is adapted for removable mounting to the housing at the defined guide slot location, a transducer means 30 for detecting data stored on a data track of a data carrier, and a mounting means 32. Mounting means 32 mounts transducer means 30 within an access window 50 formed in one side wall portion of guide means 31. The particular structure and function of mounting means 32 and the structure and function of transducer 30 are dictated by the characteristics of the data carrier and the data recording method employed thereon. As previously mentioned, the data carrier may have a bar code thereon and transducer 30 may be an optical bar code reader device. Another alternative would be a MICR check date line on a bank check or draft, with transducer 30 taking the form of an optical character recognition head or magnetic head for MICR data reading.

FIGS. 11–18 illustrate in greater detail card guide element 31 and a preferred form of a mounting arrangement for a read head 30 in the form of a magnetic read head. In this embodiment, mounting arrangement 32 comprises leaf spring 53 and clamp 54. As shown best in FIGS. 16 and 17, leaf spring 53 has a pair of mounting ears 55 formed thereon and the housing of read head 30 is fastened to mounting ears 55 using, for example, a pair of spot welds 56 on each ear. A pair of mounting apertures 57 in leaf spring 53 cooperate with a pair of projections 63 on clamp 54 and a pair of apertures 38A and 38B in side wall member 38 of card guide 31 to mount leaf spring 53 in an accurate location on side wall 38. When so mounted, a forward portion of read head 30 extends through access aperture 50 in side wall member 38.

Figure 14:
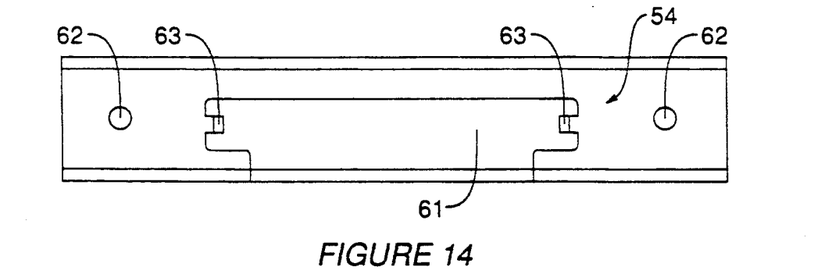
FIGS. 14 and 15 are side and end views of a clamp or bracket member employed in one embodiment of a card reader subassembly in accordance with this invention.
Figure 15:
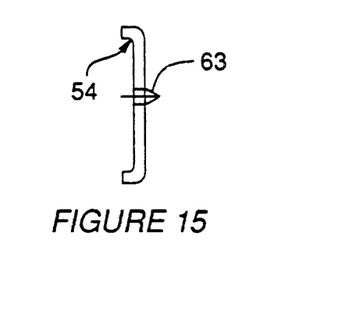
Figure 16:
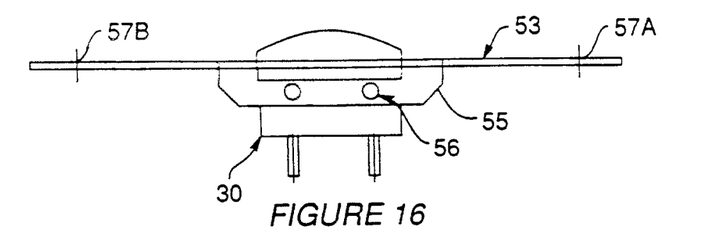
FIGS. 16-18 are top, side and end views of a leaf spring and magnetic read head assembly for one embodiment of a magnetic data card reader subassembly in accordance with this invention.
Figure 17:
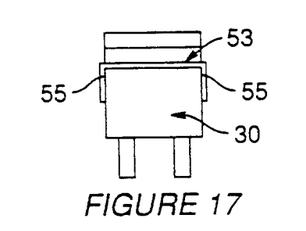
Figure 18:
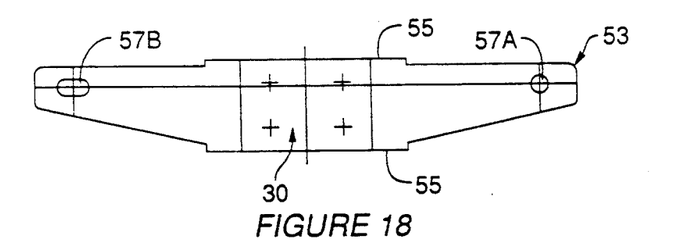

Projections 63 on clamp or bracket 54 cooperate with apertures 57A and 57B in leaf spring 53 to introduce an initial biasing spring force into the leaf spring by deforming the end portions into depressed regions 50A and 50B in side wall member 38. This biasing spring force urges the front surface 30A of transducer 30 toward the opposite wall surface of card slot 44 and sets the spring pressure which maintains the read head in contract with the magnetic stripe on a data card passing through the card slot 44.

Mounting aperture 57B is slotted to provide an adjustable mounting relationship with the projection 63 of clamp 54 extending therethrough to take up changes in effective leaf spring length as the clamp is initially assembled to the card guide element and as the position of the read head 30 changes when a card is passed through the card slot. This leaf spring and clamp mounting arrangement permits the read head 30 to rotate slightly to maintain the read head in contact with a warped data card.

As shown a threaded stud and nut mounting arrangement 52 cooperates with the mounting apertures 62 in clamp 54 to mount the clamp to the card guide element 31. Access apertures are provided through side wall member 37 to permit a press fit stud to be seated in a recess formed in side wall member 38 with the threaded stud extending through side wall member 38 to receive the clamp and the nut for fastening these two pieces together in the manner depicted.

As previously described in general terms, this invention features an arrangement for readily modifying the reader subassembly to provide two selectably configurably reading arrangements for either one of two or two of three tracks of data. As previously mentioned a one of two data track arrangment might involve two possible locations of a bar code on a data card. A two of three track reading situation may involve a data card that has three parallel data tracks, such as a magnetic card that has three possible magnetic data track locations as shown in FIG. 19.

As shown best in FIG. 14, clamp member 54 has a central open area 61 where leaf spring 53 is carried. As shown in FIGS. 12 and 13, clamp 54 may be mounted to card guide element 31 in either of two selectable orientations, one shown in FIG. 12 and the other in FIG. 13. As shown in FIGS. 12 and 13 the clamp 54, the leaf spring 53 and the mounting arrangement 52 define a reference mounting line L1. Leaf spring 53 is formed such that one of the two magnetic pick up elements, i.e. pickup element 30C, the one for track two (T2) of a three track data card will be positioned substantially on the reference mounting line L1 regardless of which one of the two mounting orientations shown in FIGS. 12 and 13 is utilized. The second pickup element 30B is displaced away from the reference mounting line L1 by substantially the distance between the two magnetic data tracks on a data card. Thus in the clamp and spring orientation shown in FIG. 12, pickup element 30B is closer to the bottom wall of the card slot 44 than the reference mounting line L1 and thus in a position to read track three (T3) on a data card. In the inverted position of the clamp and leaf spring arrangement shown in FIG. 13, pickup element 30B is further away from the bottom surface of card slot 44 and thus in position to read track one (T1) on a data card.

Reference lines B1 and B2 on FIGS. 12 and 13 designate how a single reader element, such as for a bar code reading transducer arrangement could be displaced away from reference mounting line L1 and thus be positioned alternatively above or below that line for reading bar codes at different positions on a data carrier depending on the selected one of the two possible orientations of the clamp mounting arrangement.

It should be noted that clamp 54 could also be designed to have a symmetrical opening 61 such that the mounting orientation of the leaf spring 53 alone relative to claim 54 would determine the position of read head 30 relative to the bottom wall of the card slot. Thus mounting arrangement 32 is considered to have respectively inverted mounting positions even if the design is such that only leaf spring 53 is inverted. In a more general embodiment, another mounting member carrying transducer 30 may be the part that is inverted to change the position of transducer 30 relative to a reference mounting line.

As previous described in brief terms, FIGS. 19 and 20 illustrate another embodiment of this invention which provides for altering the spacing between magnetic read head 230 and the bottom wall 239A of the card slot defined by a bottom wall segment 239 of a card guide member. As shown in FIG. 20, card guide element 239 is adapted to receive an optional card slot insert member 240 mounted within the card slot. This insert member alters the position of the bottom wall of the card guide slot. With card slot insert member 240 absent as shown in FIG. 19, a card 240 swiped through the slot will have tracks 1 and 2 (T1, T2) in position to be read by pickup elements 231 and 232 on read head 230, but track 3 (243) will not be read.

Alternatively, with card slot insert member 240 mounted in the position shown and having a suitable thickness as shown, a card 250 swiped through the card slot will have the lower pair of tracks T2 and T3 aligned for reading by pickup elements 231 and 232 track T1 will not be read.

FIGS. 19 and 20 show only a portion of the bottom wall member of the card guide element in each case. However, it should be apparent that any of the configurations of the card guide elements shown in FIGS. 2, 6, 9, and 10 are adaptable to employing this feature of the invention. While FIGS. 19 and 20 relate this feature particularly to use of a dual track magnetic pick up head for reading a magnetic stripe data card, it should be apparent that this feature can be adapted generally for reading single data tracks at different locations on a data card. The data tracks may be magnetic or optical data using appropriate transducer elements in each case.

The features of this invention have been described above in connection with several alternative embodiments. These are provided by way of example of the general principles of this invention and it should be understood that numerous other variations and different embodiments could be employed. For example, while the invention has been described particularly in connection with incorporating it within a point of sale terminal, it should be understood that the invention may be applicable to a number of forms of apparatus that provide a manual card reader capability. For example, the invention could be employed in a standalone card reader module which is adapted to be coupled to a point of sale terminal. In such an embodiment, the card guide element would still be mounted to a housing but overall the housing would be smaller and not enclose as many electronic modules and subassemblies.

It should thus be apparent that numerous alternations and adaptations of the invention are possible and the above described embodiments should be considered to be examples and not limitations. Persons of skill in this art could make numerous other modifications without departing from the scope of the invention as set forth in the following claims.

What is claimed is:

1. In apparatus for reading a magnetic data track on a data card, said magnetic data track being located at a preselected one of at least two different data track locations defined on said data card at different first and second distances from a bottom edge of said data card,
   a magnetic read head having a data pickup element on a front face thereof;
   card guide means including first and second side wall members and a bottom wall member defining a data card guide slot and having an access window defined in one of said side wall members and comprising an aperture extending through said one of said side wall members having a vertical size sufficient to admit said front face of said magnetic read head into said guide slot in different mounting positions;
   mounting means for mounting said magnetic read head on said guide means with said front face thereof extending into said guide slot and with said data pickup element selectively positioned to read said magnetic data track at said preselected one of two defined data track locations, said mounting means comprising
   a leaf spring member carrying said read head in a fixed position and orientation thereon and having a pair of mounting apertures at opposite ends thereof defining a mounting line therebetween which is displaced from the position of said data pickup element of said read head by one-half the distance between said two defined data track locations, and
   bracket means for mounting said leaf spring member in a prearranged position on said guide means and in a preselected one of a first orientation and a second orientation inverted from said first orientation with said reference mounting line positioned relative to said bottom wall member such that said one data pickup element is positioned to read said first data track when said leaf spring member is mounted in said first orientation and said one data pickup element is positioned to read said second data track when said bracket means is mounted in said second orientation.

2. Apparatus as claimed in claim 1, wherein
   said magnetic track on said data card defines three separated magnetic data track locations;
   said read head has two separated magnetic pick up heads for simultaneously detecting magnetically encoded data on two adjacent ones of said three separated magnetic data track locations; and
   said leaf spring member carries said read head in a position such that one of said two magnetic pick up heads is positioned on said reference mounting line, whereby said magnetic pick up heads on said read head are positioned for detecting data on the upper two of said magnetic data track locations as said data card is manually swiped through said guide slot when said leaf spring member is mounted in said first orientation, and said magnetic pick up heads on said read head are positioned for detecting data on the lower two of said magnetic data track locations as said data card is manually swiped through said guide slot when said leaf spring member is mounted in said second orientation.

* * * * *